(No Model.)
B. LÖWY.
FLOWER POT FOR ARTIFICIAL FLOWERS.
No. 281,706. Patented July 24, 1883.
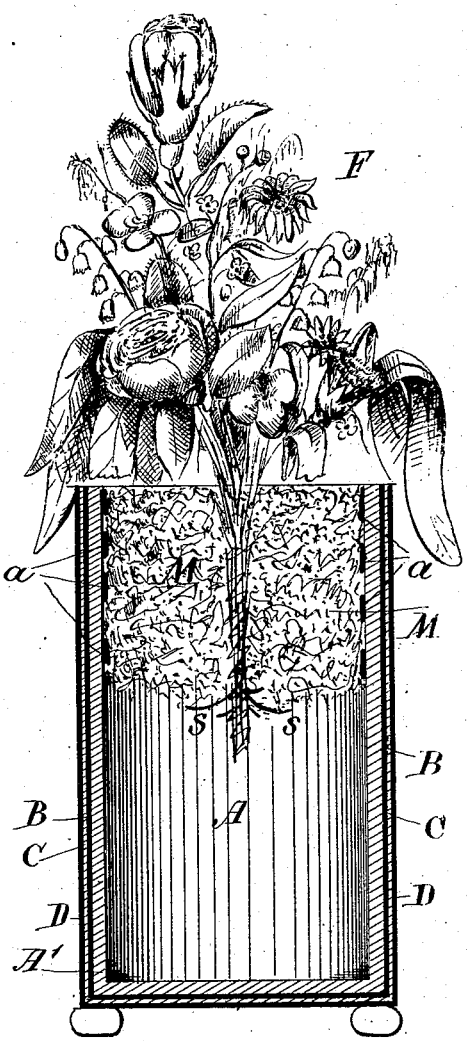
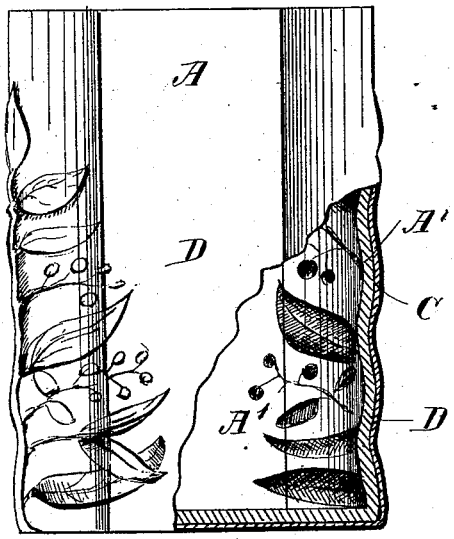

UNITED STATES PATENT OFFICE.

BENJAMIN LÖWY, OF BERLIN, GERMANY.

FLOWER-POT FOR ARTIFICIAL FLOWERS.

SPECIFICATION forming part of Letters Patent No. 281,706, dated July 24, 1883.

Application filed March 19, 1883. (No model.)

*To all whom it may concern:*

Be it known that I, BENJAMIN LÖWY, doing business under the firm-name of P. LEUCHTMANN & CO., of Berlin, a subject of the King of Prussia, residing at Berlin, Prussia, German Empire, have invented certain new and useful Improvements in Flower-Pots for Artificial Flowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Artificial flowers and plants have to a great extent taken the place of natural flowers for house-decoration, and the demand for these is constantly increasing, because they possess the advantage of remaining fresh for a very long time and require no other attention than an occasional dusting. The extensive use of artificial flowers and plants necessarily created a demand for some convenient holder (vase, pot, or other) therefor, whether for plants, bouquets, or single flowers. The holders heretofore used were generally made of porcelain, earthen or stone ware, china or majolica, and other analogous heavy frangible materials, which were finished more or less elaborately, and soon found great favor with the public. It is evident that the application of holders suitable for natural flowers or plants to artificial flowers or plants is not rational, for many reasons. The former require a water-proof or practically water-proof holder, while the latter do not. Then the fragile nature of these holders forbids their universal use as articles of commerce, and therefore correspondingly restricts the sales of artificial flowers and plants.

The manufacture of artificial flowers and plants in some countries depends largely upon exportation, and in Germany, for example, the exportation has of late assumed very large proportions, and it is therefore of importance that a means should be devised whereby artificial flowers or plants, together with appropriate holders, may be conveniently exported, and without entailing too great a cost in packing, in freight, and losses by breakage. The exportation of these articles has heretofore encountered a very serious check, if it were not made impossible altogether, on account of the difficulty in packing the holders, and with them the flower, flowers, or plant packing, which has to be done with hay and seriously affects the appearance of the said flowers or plants.

In order to adapt articles of merchandise for exportation, they should be so constituted as to be readily transported, and when unpacked present the same fresh and tasty appearance to the purchaser they had before being packed, which is not the case when holders of the materials hereinbefore described are employed for holding artificial flowers or plants. Owing to the weight of such holders, the cost of transportation is considerable, and owing to their fragility they are difficult to pack so as to avoid breakage. In no case, however, is it possible to pack them, as artificial flowers are packed for transportation, by tying or stitching them, together with the flower, flowers, or plant they contain, to the bottom of a pasteboard box, and it is therefore absolutely necessary that such holders should be packed separately, and the arrangement or placing of the flowers or plants into them left to the purchaser. This is undesirable, as it detracts from the appearance of the flowers or plants, and, in short, such holders are not adapted for shipment over sea. To remedy these inconveniences I employ holders made of paste-board or papier-maché or analogous plastic substance of great tenuity and little specific gravity, the outer surface of which is treated, as hereinafter described, to give the holder the appearance of porcelain. This surface may be plane and ornamented in any desired manner, or ornamented with designs in relief. In the former case the pasteboard is covered with plain or figured satined paper, or paper having a glossy surface, which is then treated so as to closely imitate porcelain. Such holders may have any desired form and possess the advantages of being very much lighter and cheaper than porcelain, and are practically infrangible and answer the purpose admirably, inasmuch as they need not be water-proof. Such holders are readily packed, together with the moss filling and plant or flowers they contain, in suitable pasteboard boxes, and such filling and flowers may be readily attached to the holder by any suitable adhesive substance, which is not the case with holders of porcelain and analogous materials, and thus render the article transportable and exportable in the highest degree. By stitching them in card-board boxes the flowers or plants are not injured, and on reaching their destination present the same fresh appearance as when first packed, and may be exhibited in the boxes by removal of the lid, thus greatly enhancing their salable qualities, opening a new field to this branch of the industries, and affording a means to those living remote from the seat of manufacture to adorn their houses at comparatively little expense.

The invention therefore consists in combining with artificial flowers or plants a holder—such as a vase or flower-pot—made of material of little specific gravity and practically infrangible, the surfaces of which are in imitation of porcelain; and the invention further consists in the process of obtaining such surfaces.

As above described, the holder is made of pasteboard, pulp, or other analogous plastic material molded or otherwise formed into shape. The finished article is then surfaced with a paper either of uniform color or ornamented in various colors and designs. This surface is then coated with gelatine in order to give it the appearance of porcelain, and to protect the gelatine against atmospheric influences the surface of such is lacquered, varnished, or japanned.

In the accompanying drawings I have shown, Figure 1, a vertical section of a cylindrical vase or holder constructed according to my invention. Fig. 2 is an elevation, partly in section, of a hexagonal vase, with ornaments in relief, constructed according to my invention.

Like letters of reference indicate like parts.

The vase A is composed of a shell, A', of pasteboard or card-board, or paper, straw, or other pulp or plastic material of great tenuity and little specific gravity. The vase may be fashioned by hand or molded in dies, and may then be covered with a glazed or satined paper, B, of any desired color, as shown in Fig. 1; or the pasteboard, card-board, or pulp may be colored, if desired, and the paper B may be dispensed with. The vase or flower-pot is then coated with a coat of gelatine, C, whereby the peculiar luster and transparency of the enamel of porcelain is imparted to the article, the effect of which is heightened when a satined or very highly-calendered paper forms the background or foundation for the gelatine. As the gelatine will change when exposed to atmospheric influence, I protect the same by means of a coat of colorless transparent varnish, japan, or lacquer. The stem or stems of the plant or flower or bunch of flowers F is then stuck into a bunch or layer of moss, M, and the ends S of said stems bent over the under side of the layer, so as to form an anchorage, and the moss is then glued or cemented into the vase, as shown by black short lines a a. In this manner short-stemmed flowers or plants may be employed, and but a comparatively thin layer of moss will be required to hold them securely in the pot or vase.

Of course it will be understood that I do not limit myself to any special form of vase, pot, or holder, as these may be made of any desired form, and may be ornamented by hand, in oil or other colors, or by prints or embossing.

Having thus described my invention, what I claim is—

1. The herein-described process of surfacing pasteboard or analogous flexible or plastic materials in imitation of porcelain, which consists in first coating the surface with gelatine and then applying to the latter a coat of transparent varnish, as described, for the purposes specified.

2. The herein-described process of obtaining surfaces in imitation of porcelain, which consists in first covering the surface with a highly satined or calendered paper, coating the paper with gelatine, and finally coating the gelatine with a transparent agent to protect the same against atmospheric influences, as set forth.

3. As a new article of manufacture, a vase or flower-pot made of pasteboard or analogous flexible or plastic materials, having its surface or surfaces coated with gelatine and the latter with a transparent agent to protect the same against deterioration by contact with the atmosphere, as described, for the purposes specified.

4. The combination of artificial flowers or an artificial plant having a wire stem or stems, an anchorage of moss or other analogous material, in which said stems are anchored, as described, and a vase or flower-pot constructed of materials that will permit the gluing thereto of said anchorage, and having an outer surface in imitation of porcelain, substantially as and for the purposes specified.

5. The method of packing artificial plants or flowers, with their holders, for shipment, which consists in securing them within the pots or holders by an anchorage permanently attached to the former, and then tying the holder, or the holder and flowers, to the inside of a packing-box, substantially as and for the purposes specified.

In testimony whereof I affix my signature in presence of two witnesses.

BENJAMIN LÖWY.

Witnesses:
 B. ROI,
 G. LOUBIER.